United States Patent [19]

Wu

[11] Patent Number: 5,159,268
[45] Date of Patent: Oct. 27, 1992

[54] ROTATIONAL POSITION SENSOR WITH A HALL EFFECT DEVICE AND SHAPED MAGNET

[75] Inventor: W. T. Wu, Madison, Wis.

[73] Assignee: Honeywell Inc., Minneapolis, Minn.

[21] Appl. No.: 659,594

[22] Filed: Feb. 21, 1991

[51] Int. Cl.$^5$ .................... G01B 7/30; G01B 7/14
[52] U.S. Cl. .................... 324/207.20; 324/207.12; 324/207.22; 324/207.25
[58] Field of Search .................... 324/173, 174, 207.12, 324/207.2, 207.21, 207.22, 207.25; 123/617; 310/155, 168; 318/653, 659–661; 340/870.33, 686

[56] References Cited

U.S. PATENT DOCUMENTS

| | | | |
|---|---|---|---|
| 3,777,273 | 12/1973 | Baba et al. | 324/207.21 X |
| 3,835,373 | 9/1974 | Matula | 318/653 X |
| 4,180,753 | 12/1979 | Cook | 310/168 |
| 4,570,118 | 2/1986 | Tomczak et al. | 324/251 X |
| 4,789,826 | 12/1988 | Willett | 324/252 X |

OTHER PUBLICATIONS

Lemarquand et al; Annular Magnet Position Sensor, IEEE Transactions on Magnetics, vol. 26, No. 5, Sep. 1990, pp. 2041-2043.

B. D. Inglis & G. W. Donaldson, "A New Hall-Effect Synchro", Solid-State Electronics (1966).

Primary Examiner—Gerard R. Strecker
Attorney, Agent, or Firm—William D. Lanyi

[57] ABSTRACT

A Hall Effect device is provided for use as a rotary position sensor in cooperation with a shaped magnet that imposes a magnetic field on the Hall Effect device which is generally linear and proportional to the angular position of the shaped magnet. Two alternative embodiments are described and illustrated which both provide a high degree of linearity between the electrical output of the Hall device and the rotational position of the shaped magnet. One of the alternative embodiments is generally oblong and the other alternative embodiment is generally bell shaped. Both of these alternative embodiments exhibit a high degree of linearity between the strength of the magnetic field imposed on a Hall Effect element and the rotational, or angular, position of the shaped magnet.

15 Claims, 5 Drawing Sheets

ROTATIONAL POSITION SENSOR WITH A HALL EFFECT DEVICE AND SHAPED MAGNET

BACKGROUND OF THE INVENTION

1. Field of the Invention

The present invention is generally related to the field of position sensors and, more particularly, to rotary position sensors which provide an output signal that is proportional to the angular position of a rotatable member.

2. Description of the Prior Art

In the field of position sensing, many different types of apparatus are well known to those skilled in the art. For example, contact potentiometers are commonly used to provide a very simple method for measuring rotational or rectilinear movement of elements. However, the increased temperature and life requirements in sensor applications, along with the need for much higher resolution, has necessitated the development of new measuring and sensing techniques. In the field of non-contact sensors, the linear variable differential transformer and the rotary variable differential transformer (i.e. LVDT and RVDT) have found acceptance in some applications. Also, the planar coil inductive sensor and the magnetoresistive element are potentially suitable candidates for meeting increasingly more stringent requirements relating to temperature, long life and higher resolution. Each of these techniques also has limitations. For example, RVDT sensors are generally very precise, but they are somewhat limited in their range. In addition, RVDT sensors are occasionally more expensive than a particular sensor application will permit. The planar coil inductive sensors require a relatively sophisticated electronic circuit for operation and are considered by some to be susceptible to electromagnetic interference. The rotary magnetoresistive element sensors are also limited in their range of sensing and must be compensated for temperature variation where wide temperature excursions are expected. Sensors which utilize the Hall Effect have also been used to provide a non-contact means for sensing either rectilinear or rotary motion.

Many different types of non-contact rotary sensors have been developed and are well known to those skilled in the art. For example, U.S. Pat. No. 4,180,753, which issued to Cook on Dec. 25, 1979, describes an apparatus for generating electrically distinguishable bipolar signals using a magnetic sensor and an oval wheel with teeth and notches in its minor and major axes. It makes possible the identification of a subgroup of electrical signals from the remaining electrical signals or from the entire group of signals. The electrical signals can be used together to determine a variable, such as revolutions per minute, representative of a movable element or particular individual signals of the electrically distinguishable signals can be used for initiating a function such as the firing of a spark plug in an automotive application.

U.S. Pat. No. 3,777,273, which issued to Baba et. al. on Dec. 14, 1973, describes an angular position detector which uses magnetic elements. The detector comprises a means for establishing a magnetic field wherein a magnetic flux distributes in such a manner as to vary in accordance with the angular position of a rotary shaft. At least one pair of magnetically affected elements, each having a parameter varied in accordance with a density of a magnetic flux passing therethrough, is placed in the magnetic field and incorporated in an electrical circuit. The electric circuit connects the magnetic effective elements in series to each other and impresses a DC voltage which is then divided into a voltage representing the variation of the parameter of the elements, namely the angular position of the rotary shaft.

U.S. Pat. No. 3,835,373, which issued to Matula on Sep. 10, 1974, discloses a rotational positional sensor which utilizes a Hall device and a means to maintain the Hall voltage constant. The rotational position sensor described in this patent includes a Hall Effect device which is mounted within an air gap of variable size within a magnetic circuit. The Hall Effect device is subjected to changes in magnetic flux density in direct relation to the rotational position of a cylinder member forming a part of the magnetic circuit. The magnetic circuit includes a C-shaped permanent magnet having opposite pole pieces forming air gaps with the cylindrical member. The cylindrical member comprises a half cylinder in the region of the air gap containing the Hall Effect device so as to vary the effective area of the gap and thus the flux density as the cylindrical member turns. The voltage of the Hall Effect device is applied to a feedback circuit including a differential amplifier so as to vary the current through the device as necessary to maintain the Hall voltage constant and provide an output voltage which varies linearly with the rotational position of the cylindrical member.

U.S. Pat. No. 4,570,118, which issued to Tomczak et. al. on Feb. 11, 1986, discloses an angular position transducer that includes permanent magnets and a Hall Effect device. It describes a transducer used for the purpose of creating an electrical signal proportional to the angular position of a member that is pivotally mounted on a given axis. The transducer comprises an element pivoted directly by the member and containing a means for creating a flux field linearly varying in intensity along a given operating line extending in an air gap between spaced portions and having a preselected arcuate shape. A linear Hall Effect device, with an output voltage proportional to the intensity of the flux field to which the device is exposed, is mounted at a fixed position on the operating line and in the air gap. As a result, the output voltage from the Hall Effect device varies proportionally to the position of the Hall Effect device along the operating line as the element is pivoted by the monitored member.

U.S. Pat. No. 4,789,826, which issued to Willett on Dec. 6, 1988, discloses a system for sensing the angular position of a rotatable member through the use of a Hall Effect transducer. The angular position of a member, such as the shaft of a tension arm assembly, is sensed by the combination of a circular type of magnet secured to the rotatable member and selectively polarized relative to its diameter to define a magnetic north-south pole pair and a stationary Hall Effect transducing device secured in close and constant proximity to the ring magnet. A circuit coupled to the transducing device includes offset and amplification stages. In a preferred embodiment, the Hall Effect transducing device is located in the region of a magnetic null of the field generated by the magnetic poles, when the rotatable member is in a selected angular position. The constant gap between the transducing device and the circular magnet optimizes the generation of a linear output through the circuit to accurately sense the member rotation.

In an article by B. D. Inglis and G. W. Donaldson, titled "A New Hall-Effect Synchro", which was published in Solid-State Electronics in 1966, the mathematical analysis of a Hall Effect device is provided. The article also discusses the development of miniature systems in which permanent magnet rotors and Hall plate detectors permit smaller synchros to be made. It describes the possibility that miniature synchros can be produced at acceptable cost while providing a high degree of accuracy.

While Hall Effect devices are well known to those skilled in the art, the application of Hall Effect technology to rotary sensors is usually limited by the type of output signal that is normally provided by the Hall Effect device. For example, although Hall Effect devices are widely used to detect the passage of a magnet past a Hall sensor, such as in an application to count revolutions, the use of Hall Effect technology in an rotary sensor to accurately determine the magnitude of rotation of a rotatable member is severely limited by the nonlinearity of the output signal from the Hall device when the Hall sensor is constructed according to known techniques. In other words, if a generally circular magnet having a north pole and a south pole is rotated about an axis of rotation, a Hall Effect element which is disposed a predefined distance from that axis of rotation will experience a magnetic field whose strength varies as a sinusoidal function of the angular position of the magnet. No portion of the electrical output from the Hall Effect device exhibits any significant degree of linearity with respect to the angular position of the magnet. In some applications, the small portion of the sinusoid that is near the null point of rotation, where the north and south poles have equal effect on the Hall Effect device, can sometimes be used to approximate a straight line. However, these types of approximations must be made with recognition of the fact that errors are incumbent because the output signal is not truly linear. The present invention addresses these problems by providing a rotary position sensor that utilizes a Hall Effect element in cooperation with a shaped magnet to provide a linear output in which the electrical output from the Hall Effect transducer varies proportionally and with a high degree of linearity to the angular position of the magnet.

SUMMARY OF THE INVENTION

The present invention provides a rotational position sensor for a rotatable member which comprises a means for providing an electrical signal which is proportional to the strength of a magnetic field imposed upon the providing means. In a preferred embodiment of the present invention, a Hall Effect element is used to provide that electrical signal. The present invention also comprises a means for imposing a magnetic field on the providing means. The imposing means is connected to the rotatable member and is spaced apart from the providing means, or Hall Effect device. In a preferred embodiment of the present invention, the imposing means is a shaped magnet. The strength of the magnetic field imposed on the providing means is linearly proportional to the angular position of the rotatable member. Also in the preferred embodiment of the present invention, the imposing means, or shaped magnet, is provided with a surface which is displaced radially from the axis of rotation of the rotatable member according to a relationship which is described by the equation $$R = A^{*}((\cos(\pi/K^{*}B))/(\cos(\Theta/B))^{C} \quad (1)$$

where R is the radial distance of the surface of the magnet at a position defined by an angular position $\Theta$ radians from a predefined reference. This equation utilizes predefined constants A,K,B and C which are applicable for a particular distance $R_H$ between the Hall Effect element and the axis of rotation of the shaped magnet.

In one alternative embodiment of the present invention, for a dimension $R_H$ equal to 0.284 inches, predefined constant K is equal to 2.0, predefined constant A is equal to 0.250 inches, predefined constant B is equal to 1.5765 and predefined constant C is equal to 0.25451. In that particular embodiment of the present invention, the resulting configuration of the shaped magnet is generally oblong, or "football shaped". In another alternative embodiment of the present invention, with $R_H$ equal to 0.284 inches, predefined constant K is equal to 1.8, predefined constant A is equal 0.250 inches, predefined constant B is equal to 1.1985 and predefined constant C is equal to 0.35025. In both of these alternative embodiments of the present invention, the length of the magnet, measured along its axis of rotation, is approximately 0.250 inches and the radial distance from the axis of rotation of the magnet to the Hall Effect element is approximately 0.284 inches. While the first of the two alternative embodiments of the present invention results in an oblong magnet, the second alternative embodiment results in a bell-shaped magnet. It should also be understood that mathematical relationships other than that shown in Equation 1 can be used within the scope of the present invention.

BRIEF DESCRIPTION OF THE DRAWINGS

The present invention will be more fully understood from a reading of the description of the preferred embodiment in conjunction with the drawing, in which.

DESCRIPTION OF THE PREFERRED EMBODIMENT

Throughout the description of the preferred embodiment, like elements will be identified with like reference numerals.

Figure 1:
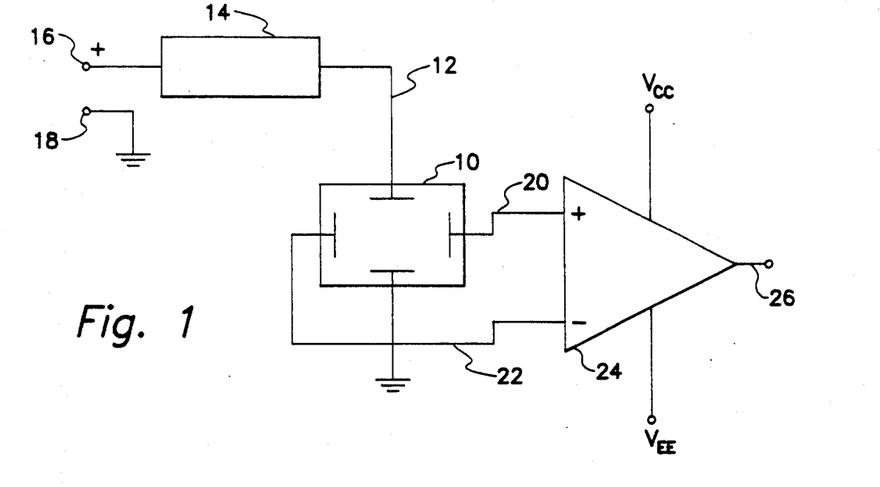
FIG. 1 shows a typical electrical circuit for utilizing a Hall Effect element.

In FIG. 1, a Hall Effect device 10 is provided with a regulated voltage on line 12 from a regulator 14. The regulator 14 is provided with an input voltage potential between points 16 and 18. The outputs from the Hall Effect device 10, on lines 20 and 22, are connected to the inverting and non-inverting inputs of a differential amplifier 24. The output of the differential amplifier 24, on line 26, is a voltage which varies proportionally with the strength of the magnetic field imposed on the Hall Effect device 10. The well known circuit configuration illustrated in FIG. 1 is used in many different applications throughout the field of sensing by those skilled in the art.

Throughout the description of the present invention, the Hall effect device 10 will be illustrated without the accompanying circuit elements shown in FIG. 1, such as the regulator 14 and the differential amplifier 24. This is done for the purposes of simplicity and clarity. However, it should be understood that the Hall Effect elements described below and illustrated in the drawing are typically connected to such circuit devices for the purpose of providing a properly conditioned signal for use in determining the angular position of a rotatable member.

Figure 2:
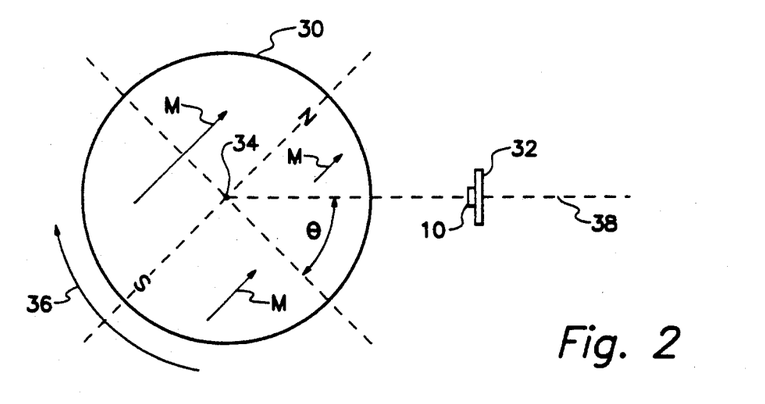
FIG. 2 shows a circular magnet associated with a Hall Effect device.

FIG. 2 shows a circular magnet 30 displaced apart from a Hall Effect device 32 which includes a Hall Effect element 10. As identified in FIG. 2, the generally circular magnet 30 comprises a north pole portion and a south pole portion which result from the magnetization of the magnet 30 in the direction indicated by arrows M. As the magnet 30 rotates about its axis of rotation, illustrated at point 34, the Hall Effect element 10 experiences a varying magnet field imposed upon it. The interaction between the effects caused by the north pole of magnet 30 and the effects caused by the south pole of magnet 30 interact and combine to impose the resulting magnetic field on the Hall Effect element 10. As the magnet 30 rotates about its axis of rotation 34, in the direction of arrow 36, the angular position is identified by angle $\Theta$ to indicate the variation in angular position of the magnet 30 from a predefined reference 38 which, in this particular instance, is illustrated as a dashed line that extends from the axis of rotation 34 through the Hall Effect element 10.

Figure 3:
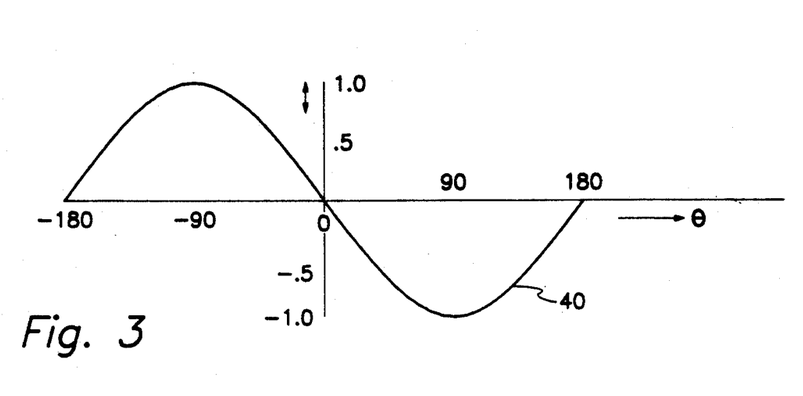
FIG. 3 shows the normalized voltage output of the Hall Element in FIG. 2 as a function of the angular position of the magnet in FIG. 2.

FIG. 3 shows the relationship between the electrical output, expressed as a normalized voltage, from the Hall Effect element 10 and the angular position of the magnet 30. As can be seen in FIG. 3, the electrical output, which is shown as a normalized output voltage in FIG. 3, varies sinusoidally with respect to the angular position $\Theta$. The null point, when $\Theta$ is equal to zero degrees, results in a balance between the effects of the north and south poles of magnet 30 and yields a zero voltage output from the Hall Effect element 10. If the device shown in FIG. 2 is used to determine the angular position of magnet 30, it can be seen that the output of the Hall Effect element 10 is nonlinear throughout its entire operational range. However, the small portion of curve 40 in FIG. 3 which is proximate the vertical axis at zero degrees $\Theta$ is generally linear within a reasonable tolerance level. Even though this portion of curve 40 isn't perfectly linear, those skilled in the art have sometimes employed this type of device to approximate a linear output within a small amount of rotation relative to the vertical axis in FIG. 3. In other words, this type of device, which utilizes a circular magnet 30, can be used to approximate a linear output for a relatively small magnitude of rotation on either side of the null point.

Figures 4, 5, 6:
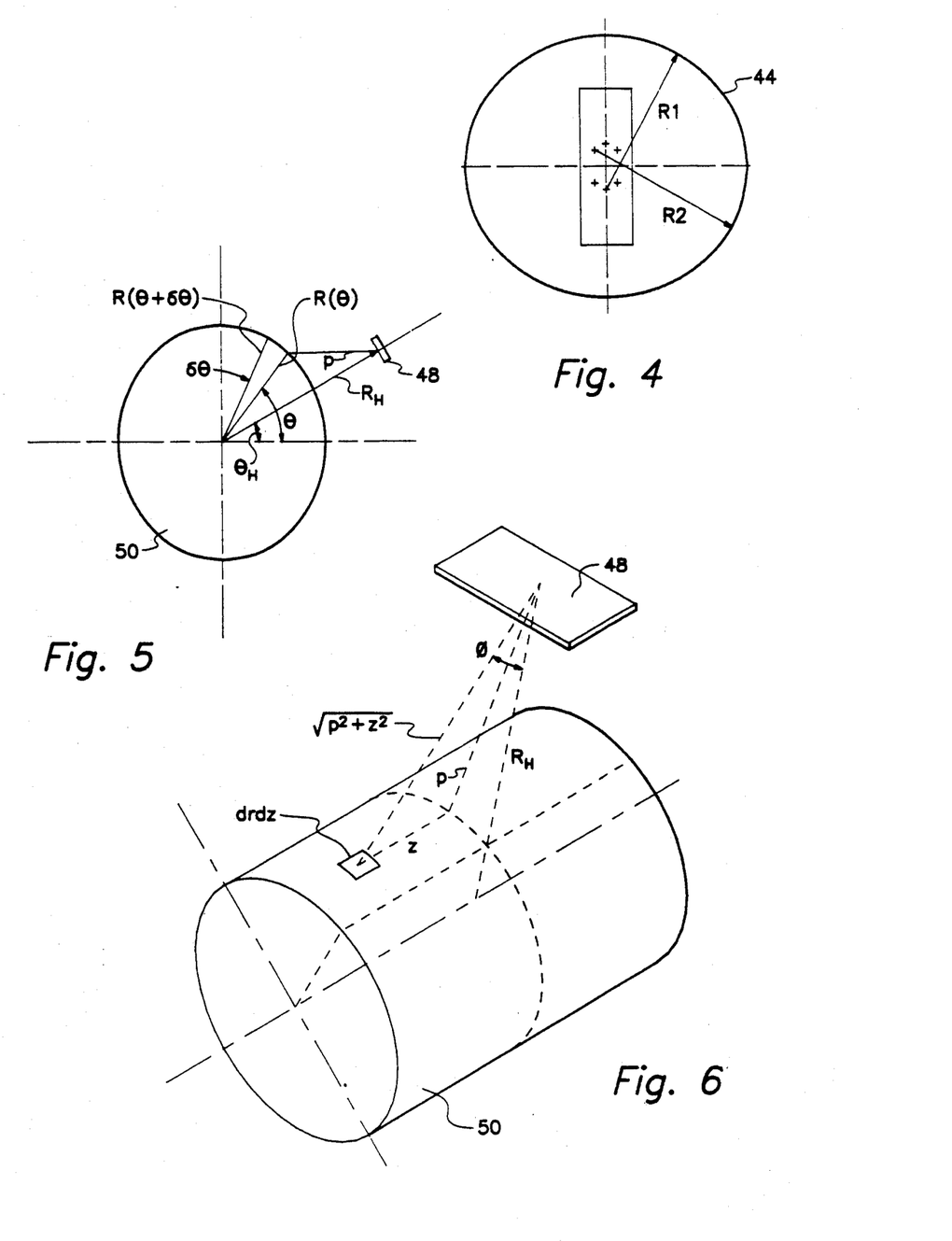
FIG. 4 shows one type of shaped magnet which resulted from an attempt to linearize the output shown in FIG. 3.
FIGS. 5 and 6 are illustrations used for the purpose of describing the mathematical analysis underlying the concepts of the present invention.

To improve the linearity of a system such as that shown in FIG. 2, those skilled in the art have attempted to modify the shape of the circular magnet 30 to straighten the portion of curve 40 between plus and minus 90 degrees. If that portion of the sinusoid 40 can be made to resemble a straight line, the electrical output of a Hall Effect element 10 can be used to provide a voltage that is a linear function of the angular position of the magnet 30. FIG. 4 illustrates one attempt to modify the shape of magnet 30 to linearize the output of the Hall Effect device 10. In FIG. 4, a shaped magnet 44 is very slightly oblong. Two radii, R1 and R2 centered at different points proximate the center of the oblong, are used to define individual circular portions of the magnet's surface. These different radii are blended together to result in a generally smooth and non-circular cross section of the magnet 44. Each quadrant of the magnet 44 is similarly produced. These slight differences between the major and minor axes of magnet 44 result in a change in the relationship between the effects caused by the north pole of magnet 44 and those caused by south pole. This type of shaping of magnet 44 resulted from numerous trial and error experiments which each yielded a slight degree of straightening in the portion of curve 40 of FIG. 3 proximate the vertical axis. In other words, the shaping of magnet 44, as shown in FIG. 4, resulted in a beneficial distortion of curve 40 in FIG. 3 to yield a generally linear portion of curve 40 within a limited magnitude of rotation on both sides of magnetic null.

While a magnet such as that shown in FIG. 4 and identified by reference numeral 44 improves the linearity of the Hall output from that shown in FIG. 3, the result is not sufficiently linear to permit the device to be used in systems that require a significant degree of linearity between the Hall output and the rotational position of the magnet over a substantial portion of the rotational range of a rotatable device.

The present invention mathematically determines the appropriate shape for a magnet to achieve a higher degree of linearity than that which can be achieved by magnets such as that shown in FIG. 4. FIGS. 5 and 6 should be viewed in conjunction with each other to understand the mathematical derivation of the equations used to develop the shapes of the alternative embodiments of the present invention.

Throughout the following discussion of FIGS. 5 and 6, the following nomenclature will be used. $B_r$ refers to the remanence flux density of the magnetic material. $R(\Theta)$ represents the radius of the magnet surface expressed as a function of angle $\Theta$ which is the magnitude of angular displacement, in radians, of the magnet measured relative to a predefined reference. The length of the magnet, measured along its axis of rotation, is represented by a. $R_H$ is used to identify the distance between the Hall Effect element and the axis of rotation of the magnet and $\Theta_H$ is used to represent the Hall plate angular position measured in radians from the magnetic axis of rotation. The symbol T is used to identify the equivalent pole density and is derived according to the relationship shown in equation 2.

$$T = [R(\Theta)*\text{Cos}(\Theta) - R(\Theta + \delta\Theta)*\text{Cos}(\Theta + \delta\Theta)]/\sqrt{(R(\Theta)*\delta\Theta)^2 + (R(\Theta) + \delta\Theta) - R(\Theta))^2} \qquad (2)$$

-continued $$H_I = [B_r/4\pi] \int_{-l/2}^{l/2} \int_0^{\pi/2} \frac{(R(\Theta) \cdot T \cdot \cos(\Phi))}{pI^2 + Z^2} d\Theta dZ \quad (3)$$

$$p_1^2 = R(\Theta)^2 + R_H^2 - 2R(\Theta) \cdot \cos(\Theta - \Theta_H) \quad (4)$$

$$p_2^2 = R(\Theta)^2 + R_H^2 + 2R(\Theta) \cdot R_H \cdot \cos(\Theta + \Theta_H) \quad (5)$$

$$p_3^2 = R(\Theta)^2 + R_H^2 + 2R(\Theta) \cdot R_H \cdot \cos(\Theta_H - \Theta) \quad (6)$$

$$p_4^2 = R(\Theta)^2 + R_H^2 - 2R(\Theta) \cdot R_H \cdot \cos(\Theta + \Theta_H) \quad (7)$$

Equation 3 represents the relationship between the variables described above and the magnetic field strength at the Hall Effect element resulting from one quadrant of the shaped magnet made in accordance with the present invention. Equation 3 has been developed with the assumption that the Hall Effect device is disposed in a manner which places the Hall plate perpendicular to a line passing radially through the axis of rotation of the magnet. In addition, the equations have been developed with the assumption that the magnet is made from ferrite or rare-earth materials. Equations 4, 5, 6, and 7 define the magnitude of the first quantity shown in the denominator of the doubly integrated fraction shown in Equation 3. It should be understood that four separate calculations using Equation 3 are necessary to define the entire effect on the Hall Effect device 48 by the magnet 50, as shown in FIGS. 5 and 6. For the first quadrant, the value determined by Equation 4 is used in conjunction with Equation 3, for the second quadrant the results determined by Equation 5 are used in conjunction with Equation 3, and so on.

The value of $\cos(\Phi)$ is determined by the relationship illustrated below in Equation 8.

$$\cos(\Theta) = [R_H^2 + p_I^2 - R(\Theta)^2] / [2R_H \cdot \sqrt{p_I^2 + Z^2}] \quad (8)$$

After Equation 3 is calculated for each quadrant of the magnet 50, with each calculation using the individual results of Equations 4, 5, 6 or 7, the results of the four calculations are added algebraically to determine the total strength of the magnetic field being imposed on the Hall Effect element 48 by magnet 50. This is shown in Equation 9.

$$H = H_1 + H_2 - H_3 - H_4 \quad (9)$$

By expressing the radius vector of the magnet surface R as a function of angle $\Theta$ with assigned values of its parameters and substituting those results in to Equations 3 through 9, the response of the Hall Effect element can be determined, with a fixed magnitude of $R_H$, for several values of $\Theta_H$ or the equivalent angular position of magnet relative to the fixed Hall Effect device. By iterating the parameters with the assistance of a mathematical technique, such as the method of steepest decent, the optimum shape of the magnet for a linear Hall output can be obtained.

Although the present invention will be described below in terms of optimized values of A,K,B and C of the formula discussed above and shown as Equation 1, it should be clearly understood that the present invention is not limited to sensors using magnets shaped according to this formula. Instead, Equation 1, merely illustrates one example of the present invention's concept of shaping each quadrant of the shaped magnet in accordance with a single mathematical relationship which has been optimized to make the magnetic field strength imposed on the Hall Effect element be linear with the angular position of the magnet.

Figure 7:
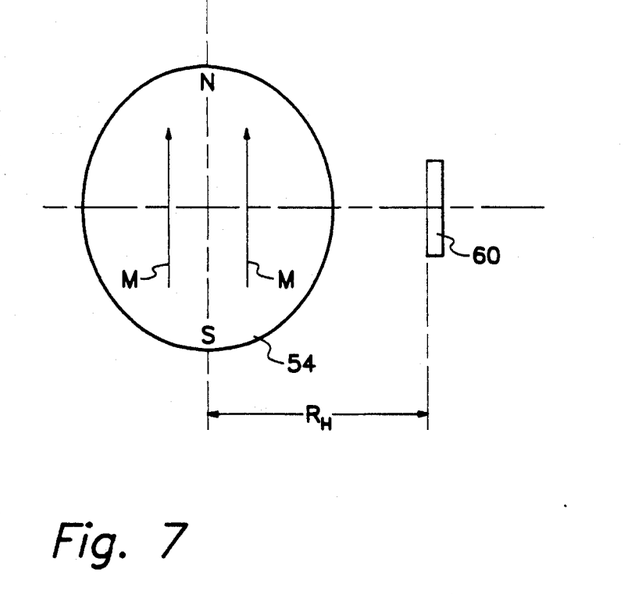
FIG. 7 illustrates one of the alternative embodiments of the present invention.
Figure 8:
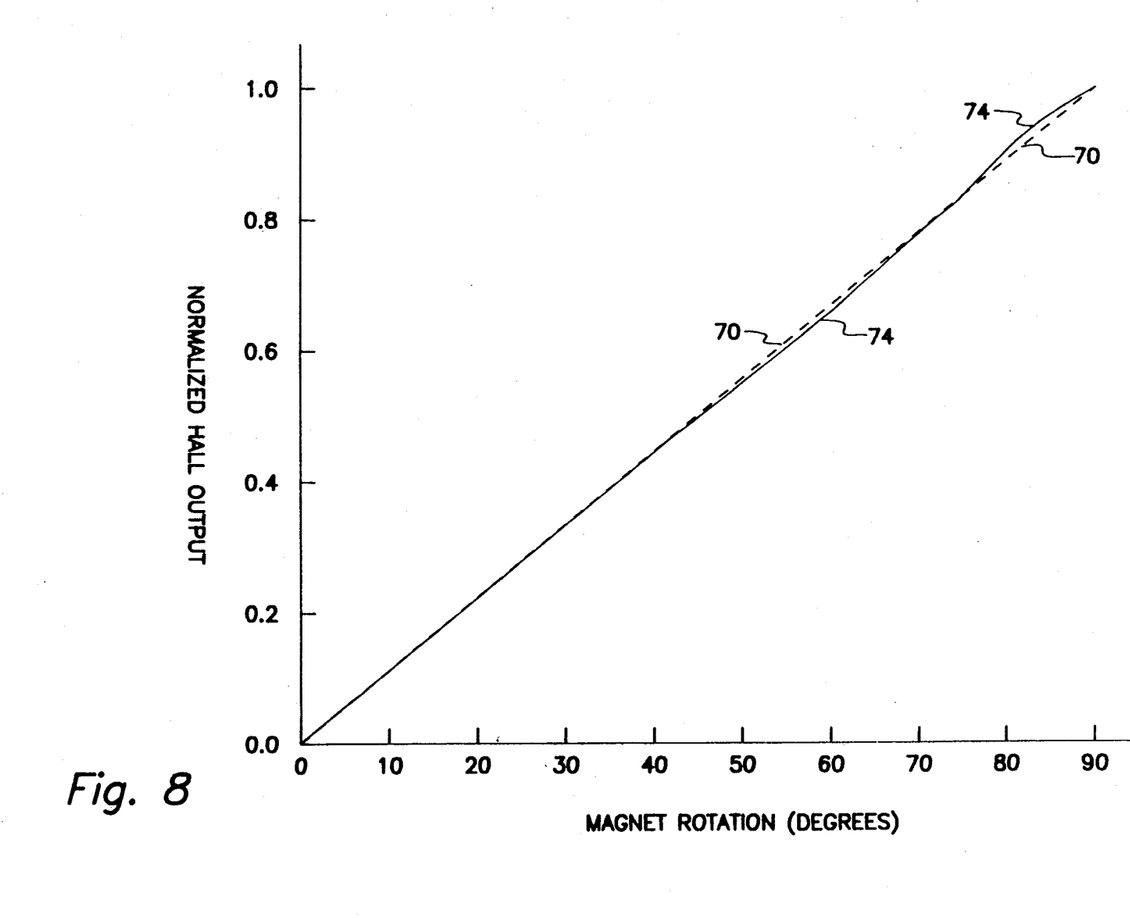
FIG. 8 shows the generally linear relationship between the angular position of the magnet shown in FIG. 7 and the electrical output of the Hall Effect device shown in FIG. 7.

Using the basic exemplary relationship represented by Equation 1 above, the constants K, A, B, and C can be manipulated to optimize the selection of a particular one of the family of curves represented by Equation 1 for a device with $R_H = 0.284$ inches. If predefined constant K is set equal to 2.0, a shape generally similar to the magnet 54 in FIG. 7 results. When magnetized along the directions identified by arrows M in FIG. 7, magnet 54 forms north and south poles as shown. As described above, the magnet 54 is generally disposed apart from a Hall Effect element 60. When predefined constants A, B, and C are set to 0.250 inches, 1.5765 and 0.25451 respectively, the shape of magnet 54 yields the relationship between the electrical output of the Hall Effect device and the angular position of magnet 54 as shown in FIG. 8. It should be understood that the position of magnet 54 illustrated in FIG. 7 is at the null position where the effect caused by the north and south poles are equivalent to each other and effectively cancel each other with regard to the normalized voltage output of the Hall Effect element 60.

In FIG. 8, reference numeral 70 is used to identify a straight line which represents the ideal linear relationship between the strength of the magnetic field at the Hall Effect element, and thus the normalized voltage output of the Hall device, and the angular displacement of the magnet about its axis of rotation. Reference numeral 74 is used to identify the actual relationship between the voltage output at the Hall Effect element and the angular position of the magnet 54 in FIG. 7. As can be seen, the relationship between these variables shown in FIG. 8 are remarkably linear, although not perfectly linear. For example, between 47 and 65 degrees of rotation the voltage output represented by line 74 is slightly less than the theoretical value represented by straight line 70. Similarly, from approximately 75 degrees to slightly less than 90 degrees of rotation, the actual voltage output represented by line 74 is slightly greater than the theoretical value represented by straight line 70. In other words, while the results of the shape of the present invention illustrated in FIG. 7 and described above is a significant improvement over the prior art, the results exhibit slight imperfections as shown in FIG. 8. However, it should be clearly understood that the linearity of the relationship represented in FIG. 8 is well within the tolerance band of acceptability for most rotary sensor applications.

Figure 9:
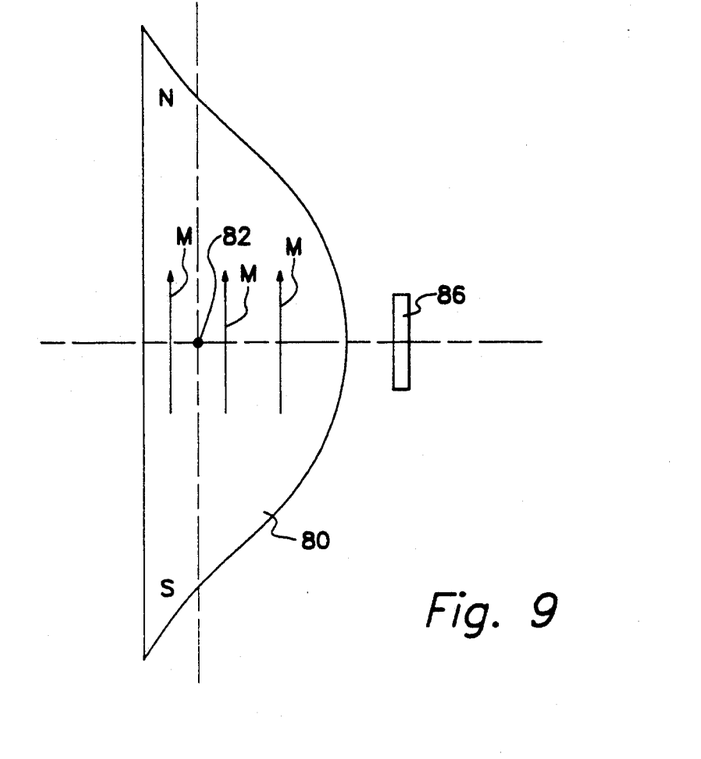
FIG. 9 illustrates another alternative embodiment of the present invention.

With continued reference to Equation 1, an alternative embodiment of the present invention can be achieved by setting predefined constant K equal to 1.8. By further setting predefined constant A to 0.250 inches, predefined constant B to 1.1985 and predefined constant C to 0.35025, the shape represented in FIG. 9 can be achieved. It should be noted that the magnet 80 is positioned to rotate about its axis of rotation 82. It should also be noted that the shape of magnet 80 is not symmetrical about any vertical line in FIG. 9. The shape of magnet 80 results from the optimization of the linearity of magnetic field strength represented by the equations represented above. Magnet 80 in FIG. 9 is "bell shaped" as this term is normally used in the field of mathematics. The shape of magnet 80 is generally symmetrical about a horizontal line extending from the axis of rotation 82 through the Hall Effect element 86 in FIG. 9. The lines of magnetization are represented by arrows M and this magnetization results in north and south poles as shown.

Figure 10:
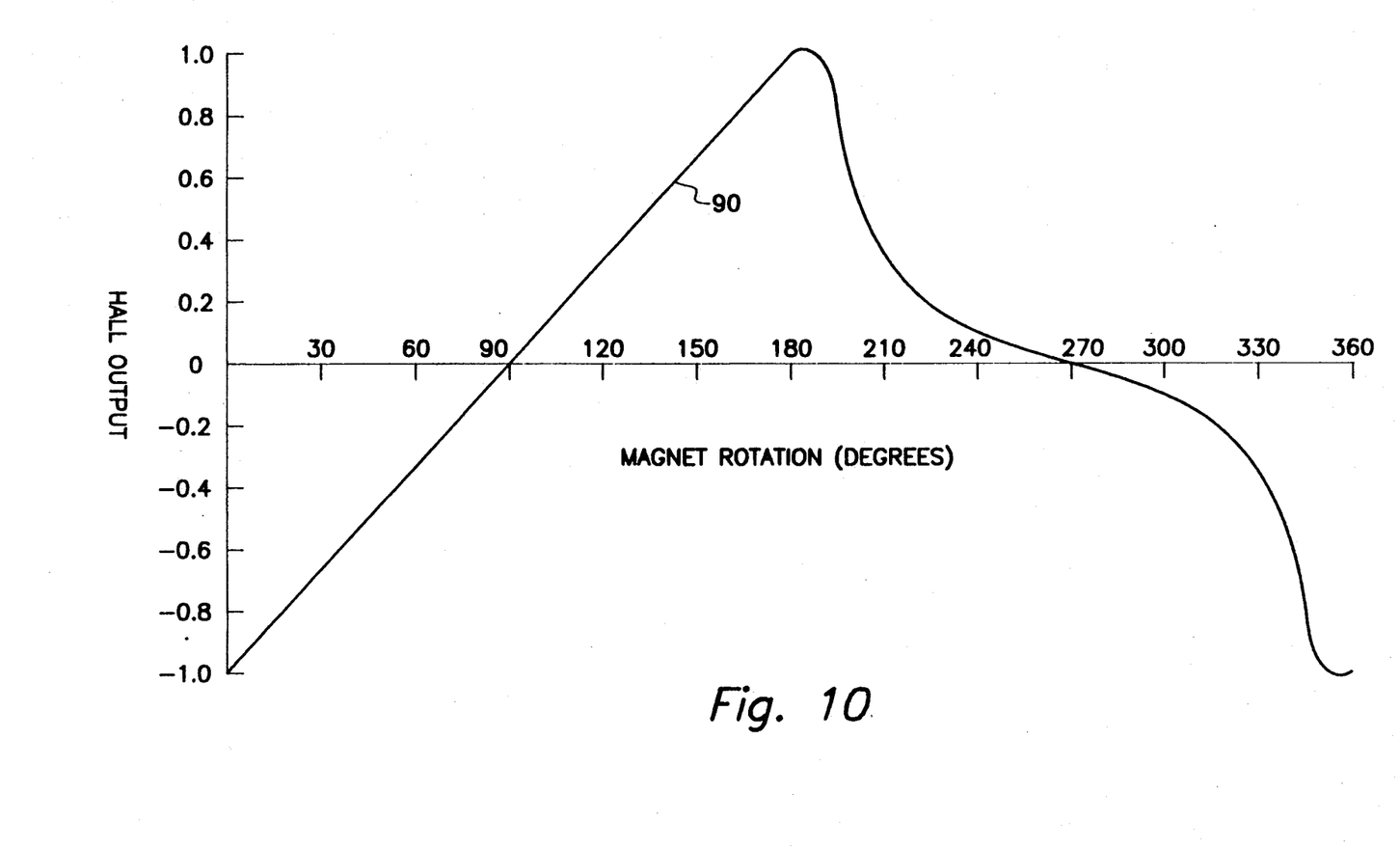
FIG. 10 illustrates the output of the Hall Effect device in FIG. 9 as a function of the angular position of the magnet shown in FIG. 9.

The relationship between the electrical output of the Hall Effect element 86 in FIG. 9 and the angular position of rotation of magnet 80 is shown in FIG. 10. As can be seen, the output from the Hall Effect element is remarkably linear over a range of 180 degrees of rotation. With regard to FIGS. 9 and 10, it should be clearly understood that the point in FIG. 10 where line 90 crosses the horizontal line representing zero volts output from the Hall device shows the magnitude of magnet rotation to be 90 degrees. This represents 90 degrees of travel from a position which is different from that shown in FIG. 9. The angular position of magnet 80 in FIG. 9 is in the 90 degree position, or null position, represented by the crossover of line 90 through the horizontal axis in FIG. 10.

By viewing FIG. 10, it can be seen that a very significant degree of linearity has been achieved by the bell shaped magnet 80 illustrated in FIG. 9 and described above. Although the relationship between magnet rotation and Hall output is clearly not linear beyond the point identified as 180 degrees in FIG. 10, significant improvement is achieved by the bell shaped magnet 80 compared to other shapes in the range of travel identified as extending between zero degrees and 180 degrees in FIG. 10. Therefore, for applications which require linearity over plus and minus 90 degrees of travel, the bell shaped magnet 80 shown in FIG. 9 appears to achieve near perfect linearity.

With reference to FIGS. 8 and 10, it should be understood that curve 74 in FIG. 8 would change to a negative slope beyond 90 degrees of rotation and then proceed until that continuing line extends to the horizontal axis, at which time it would again reverse slope at 180 degrees of rotation to repeat the cycle described above. This results from the fact that magnet 54 shown in FIG. 7 is symmetrical and continued rotation would repeat the pattern shown in FIG. 8, as mirror images, with negative slopes alternating with positive slopes. The relationship represented in FIG. 10, on the other hand, clearly shows that the linearity of the device shown in FIG. 9 is limited to the 180 degrees travel that includes plus or minus 90 degrees of travel with respect to the null position.

Although the present invention has been described with significant detail and has been illustrated with a high degree of specificity, it should clearly be understood that alternative embodiments which have not been described in detail above should also be considered within the scope of the present invention including those which use equations different from Equation 1 or predefined constants different from the examples discussed above.

I claim:

1. A rotational position sensor for a rotatable member, comprising:
   means for providing an electrical signal proportional to the strength of a magnetic field imposed upon said providing means; and
   means connected to said rotatable member and spaced apart from said providing means for imposing a magnetic field on said providing means, the strength of said magnetic field imposed on said providing means being linearly proportional to the angular position of said rotatable member, said imposing means comprising a shaped magnet with at least one quadrant of said shaped magnet having a surface displaced radially from the axis of rotation of said rotatable member, the shape of said surface being defined by a single continuous relationship for said one quadrant of said imposing means, said single relationship being $$R = A*((\cos(\pi/K*B))/(\cos(\theta/B))^c$$

where R is the radial distance of said surface at a position defined by an angular position $\pi$ radians from a predefined reference and A,K,B and C are constants, said shaped magnet being generally bell-shaped.

2. The sensor of claim 1, wherein:
said providing means comprises a Hall Effect device.

3. The sensor of claim 1, wherein:
said constant K is equal to 1.8.

4. The sensor of claim 3, wherein:
said constant A is equal to 0.250 inches, said constant B is equal to 1.1985 and said constant C is equal to 0.35025 for a sensor having a distance of 0.284 inches between the providing means and said axis of rotation.

5. A rotational position sensor for providing an electrical signal proportional to the angular position of a rotatable member, comprising:
   a Hall Effect device disposed in a plane, said plane being generally parallel to the axis of rotation of said rotatable member; and
   a shaped magnet attached to said rotatable member, said shaped magnet being shaped to provide a magnetic field at said Hall Effect device, the strength of said magnetic field being a generally linear function of said angular position of said rotatable member between a first rotational position and a second rotational position, said shaped magnet comprising a segment defined by $$R = A*(\cos(\pi/K*B))/(\cos(\theta/B))^c$$

where R is the radial distance between a surface of said shaped magnet and the axis of rotation of said rotatable member at an angular position $\theta$ radians from a predefined reference and A,K,B and C are constants, said shaped magnet being generally bell-shaped.

6. The sensor of claim 5, wherein:
said constant K is equal to 1.8.

7. The sensor of claim 6, wherein:
said constant A is equal to 0.250 inches, said constant B is equal to 1.1985, and said constant C is equal to 0.35025.

8. The sensor of claim 5, wherein:
said rotatable member is a fuel throttle.

9. The sensor of claim 5, wherein:
said rotatable member is an automobile accelerator pedal.

10. A rotational position sensor for providing an electrical signal proportional to the angular position of a rotatable member, comprising:
   means for providing an electrical signal proportional to the strength of a magnetic field imposed on said providing means; and
   a shaped magnet attached to said rotatable member, said shaped magnet being bell-shaped in cross section to provide a segment having a surface which varies in radial distance from the axis of rotation of said rotatable member as a function of the angular distance from a predefined reference, said electrical signal being generally linear between a first rotational position and a second rotational position.

11. The sensor of claim 10, wherein:
said surface of said magnet is defined by $$R = A*((\cos(\pi/K*B)))/(\cos(\Theta/B))^C$$

where R is the radial distance of said surface from said axis of rotation as a function of an angular distance $\Theta$ from a predefined reference and A, K, B and C are constants.

12. The sensor of claim 11, wherein:
said providing means is a Hall Effect device.

13. The sensor of claim 12, wherein:
said rotatable member is a fuel throttle.

14. The sensor of claim 13, wherein:
said rotatable member is an accelerator pedal.

15. The sensor of claim 11, wherein:
said constant A is equal to 0.250 inches, said constant B is equal to 1.1985, said constant C is equal to 0.35025 and said constant K is equal to 1.80.

* * * * *